US011373091B2

(12) United States Patent
Busch et al.

(10) Patent No.: US 11,373,091 B2
(45) Date of Patent: Jun. 28, 2022

(54) SYSTEMS AND METHODS FOR CUSTOMIZING NEURAL NETWORKS

(71) Applicant: Syntiant, Aliso Viejo, CA (US)

(72) Inventors: Kurt F. Busch, Laguna Hills, CA (US); Pieter Vorenkamp, Laguna Beach, CA (US); Stephen W. Bailey, Irvine, CA (US)

(73) Assignee: Syntiant, Irvine, CA (US)

( * ) Notice: Subject to any disclaimer, the term of this patent is extended or adjusted under 35 U.S.C. 154(b) by 871 days.

(21) Appl. No.: 16/164,671

(22) Filed: Oct. 18, 2018

(65) Prior Publication Data

US 2019/0122109 A1    Apr. 25, 2019

Related U.S. Application Data

(60) Provisional application No. 62/574,650, filed on Oct. 19, 2017.

(51) Int. Cl.
*G06N 3/08* (2006.01)
*G06F 8/65* (2018.01)
(Continued)

(52) U.S. Cl.
CPC ............... *G06N 3/08* (2013.01); *G06F 8/65* (2013.01); *G06F 16/16* (2019.01); *G06N 3/0635* (2013.01); *G06N 3/105* (2013.01)

(58) Field of Classification Search
CPC ...................................................... G06N 3/08
(Continued)

(56) References Cited

U.S. PATENT DOCUMENTS 7,215,663 B1 * 5/2007 Radulovic ............. H04L 47/781
                                                      370/356
8,990,133 B1    3/2015 Ponulak et al.
(Continued)

FOREIGN PATENT DOCUMENTS

WO        2015127130 A2    8/2015

OTHER PUBLICATIONS

T. Arsan, A. S. Ogrenci and T. Saydam, "A Systems Software Architecture for Training Neural, Fuzzy Neural and Genetic Computational Intelligent Networks," The 2006 IEEE International Joint Conference on Neural Network Proceedings, 2006, pp. 5275-5280, doi: 10.1109/IJCNN.2006.247282. (Year: 2006).*
(Continued)

*Primary Examiner* — James D. Rutten
(74) *Attorney, Agent, or Firm* — Ravi Mohan; Rutan & Tucker, LLP

(57) ABSTRACT

Provided herein is a system including, in some embodiments, one or more servers and one or more database servers configured to receive user-specific target information from a client application for training a neural network on a neuromorphic integrated circuit. The one or more database servers are configured to merge the user-specific target information with existing target information to form merged target information in the one or more databases. The system further includes a training set builder and a trainer. The training set builder is configured to build a training set for training a software-based version of the neural network from the merged target information. The trainer is configured to train the software-based version of the neural network with the training set to determine a set of synaptic weights for the neural network on the neuromorphic integrated circuit.

20 Claims, 11 Drawing Sheets

(51) Int. Cl.
    *G06N 3/063*     (2006.01)
    *G06F 16/16*     (2019.01)
    *G06N 3/10*     (2006.01)

(58) Field of Classification Search
    USPC .......................................................... 706/39
    See application file for complete search history.

(56) References Cited

U.S. PATENT DOCUMENTS

| | | |
|---|---|---|
| 9,767,410 B1 | 9/2017 | Guevara et al. |
| 10,083,006 B1 * | 9/2018 | Feuz ........................ H04W 4/12 |
| 2013/0073495 A1 | 3/2013 | Izhikevich et al. |
| 2014/0089232 A1 | 3/2014 | Buibas et al. |
| 2015/0324686 A1 * | 11/2015 | Julian ...................... G06N 3/08 |
| | | 706/25 |
| 2015/0324690 A1 * | 11/2015 | Chilimbi .................. G06N 3/08 |
| | | 706/25 |
| 2017/0017879 A1 | 1/2017 | Kataeva et al. |
| 2017/0076198 A1 * | 3/2017 | Jin ........................... G06N 3/08 |
| 2020/0193285 A1 * | 6/2020 | Ishii ..................... G06K 9/6273 |

OTHER PUBLICATIONS

M. Ribeiro, K. Grolingerand M. A. M. Capretz, "MLaaS: Machine Learning as a Service," 2015 IEEE 14th International Conference on Machine Learning and Applications (ICMLA), 2015, pp. 896-902, doi: 10.1109/ICMLA.2015.152. (Year: 2015).*
International Search Report, PCT Application No. PCT/US18/56754, dated Jan. 10, 2019.

* cited by examiner

SYSTEMS AND METHODS FOR CUSTOMIZING NEURAL NETWORKS

PRIORITY

This application claims the benefit of priority to U.S. Provisional Patent Application No. 62/574,650, filed Oct. 19, 2017, titled, "SYSTEMS AND METHODS FOR CUSTOMIZING NEURAL NETWORKS," which is incorporated by reference in its entirety into this application.

FIELD

Embodiments of the disclosure related to the field of neuromorphic computing. More specifically, embodiments of the disclosure relate to systems and methods for customizing a neural network of a neuromorphic integrated circuit.

BACKGROUND

In computer science, machine learning is a discipline of artificial intelligence ("AI") directed to providing machines the ability to learn from data and make predictions on such data. One branch of machine learning includes, for example, deep learning, which utilizes deep, or multilayered, neural networks to learn from data and make predictions on such data. Machine learning is becoming commonplace for numerous applications including bioinformatics, computer vision, video games, marketing, medical diagnostics, online search engines, and other machine-learning applications; however, conventional central processing units ("CPUs") that process instructions based on "clocked time" are not able to process the data required of machine-learning applications while keeping power consumption low. There are research efforts to develop direct hardware implementations of deep neural networks that aim to keep power consumption low, but existing research efforts still fall short of providing the requisite processing power for machine-learning applications—particularly custom processing capabilities for new applications and new situations in existing applications—while keeping power consumption low enough for everyday use such as in stand-alone battery-powered devices. Disclosed herein are systems and methods for customizing neural networks with custom processing capabilities for new applications and new situations in existing applications.

SUMMARY

Provided herein is a system for customizing neural networks including, in some embodiments, one or more servers and one or more database servers. The one or more servers are configured to receive user-specific target information from a client application for training a neural network on a neuromorphic integrated circuit. The one or more database servers are configured to receive the user-specific target information from the one or more servers and merge the user-specific target information in one or more databases. The one or more databases include existing target information. The merge of the user-specific target information forms merged target information in the one or more databases. The system further includes a training set builder and a trainer. The training set builder is configured to build a training set for training a software-based version of the neural network from the merged target information. The trainer is configured to train the software-based version of the neural network with the training set to determine a set of synaptic weights for the neural network on the neuromorphic integrated circuit.

In some embodiments, the training set builder is further configured to build the training set to use existing training for the existing target information.

In some embodiments, the trainer is further configured to update the synaptic weights for the software-based neural network for previously learned existing target information in view of newly learned user-specific target information.

In some embodiments, the system further includes a file builder configured to build a file of the set of synaptic weights for updating firmware of the neuromorphic integrated circuit including the neural network. The one or more servers are further configured to provide the file to the client application for updating the firmware of the neuromorphic integrated circuit with the set of synaptic weights for the neural network.

Provided herein is a system for customizing neural networks including, in some embodiments, one or more servers and one or more database servers. The one or more servers are configured to receive user-specific target information from a client application for training a neural network on a neuromorphic integrated circuit. The one or more database servers are configured to receive the user-specific target information from the one or more servers and merge the user-specific target information in one or more databases. The one or more databases include existing target information. The merge of the user-specific target information forms merged target information in the one or more databases. The system further includes a training set builder and a trainer. The training set builder is configured to build a training set for training a software-based version of the neural network from the merged target information. The trainer is configured to train the software-based version of the neural network with the training set to determine a set of synaptic weights for the neural network on the neuromorphic integrated circuit. The system further includes a file builder. The file builder is configured to build a file of the set of synaptic weights for updating firmware of the neuromorphic integrated circuit including the neural network.

In some embodiments, the training set builder is further configured to build the training set to use existing training for the existing target information. The trainer is further configured to update the synaptic weights for the software-based neural network for previously learned existing target information in view of newly learned user-specific target information. The one or more servers are further configured to provide the file to the client application for updating the firmware of the neuromorphic integrated circuit with the set of synaptic weights for the neural network.

Also provided herein is a method for customizing neural networks including, in some embodiments, receiving user-specific target information for training a neural network on a neuromorphic integrated circuit; merging the user-specific target information with existing target information to form merged target information; building a training set for training the neural network from the merged target information; and training the neural network to determine a set of synaptic weights for the neural network. Receiving the user-specific target information includes receiving the user-specific target information from a client application by one or more servers. Receiving the user-specific target information further includes receiving the user-specific target information from the one or more servers by one or more database servers. Merging the user-specific target information with existing target information includes merging the user-specific target information in one or more databases including the existing target information to form the merged target information in the one or more databases. Building the training set for training the neural network includes building the training set with a training set builder, wherein the training set is for training a software-based version of the neural network from the merged target information. Training the neural network includes training the software-based version of the neural network with a trainer on the training set to determine the set of synaptic weights for the neural network on the neuromorphic integrated circuit.

In some embodiments, the method further includes labeling the target information in the one or more databases before merging the user-specific target information in the one or more databases. The labeling includes labeling keywords for keyword spotting.

In some embodiments, building the training set includes building the training set configured to use existing training for the existing target information.

In some embodiments, the method further includes updating, with the trainer, the synaptic weights for the software-based neural network for previously learned existing target information in view of newly learned user-specific target information. The updating includes training the software-based neural network on information other than the existing target information already learned.

In some embodiments, the method further includes building, with a file builder, a file of the set of synaptic weights for updating firmware of the neuromorphic integrated circuit including the neural network.

In some embodiments, the method further includes providing the file to the client application, thereby allowing the firmware of the neuromorphic integrated circuit to be updated with the set of synaptic weights for the neural network.

In some embodiments, the method further includes labeling the target information in the one or more databases before merging the user-specific target information in the one or more databases, wherein the labeling includes labeling keywords for keyword spotting; updating, with the trainer, the synaptic weights for the software-based neural network for previously learned existing target information in view of newly learned user-specific target information, wherein the updating includes training the software-based neural network on information other than the existing target information already learned; and building, with a file builder, a file of the set of synaptic weights for updating firmware of the neuromorphic integrated circuit including the neural network; providing the file to the client application, thereby allowing the firmware of the neuromorphic integrated circuit to be updated with the set of synaptic weights for the neural network. Building the training set includes configuring the training set to use existing training for the existing target information.

DRAWINGS

Embodiments of this disclosure are illustrated by way of example and not by way of limitation in the figures of the accompanying drawings, in which like references indicate similar elements and in which.

DESCRIPTION

Figure 1:
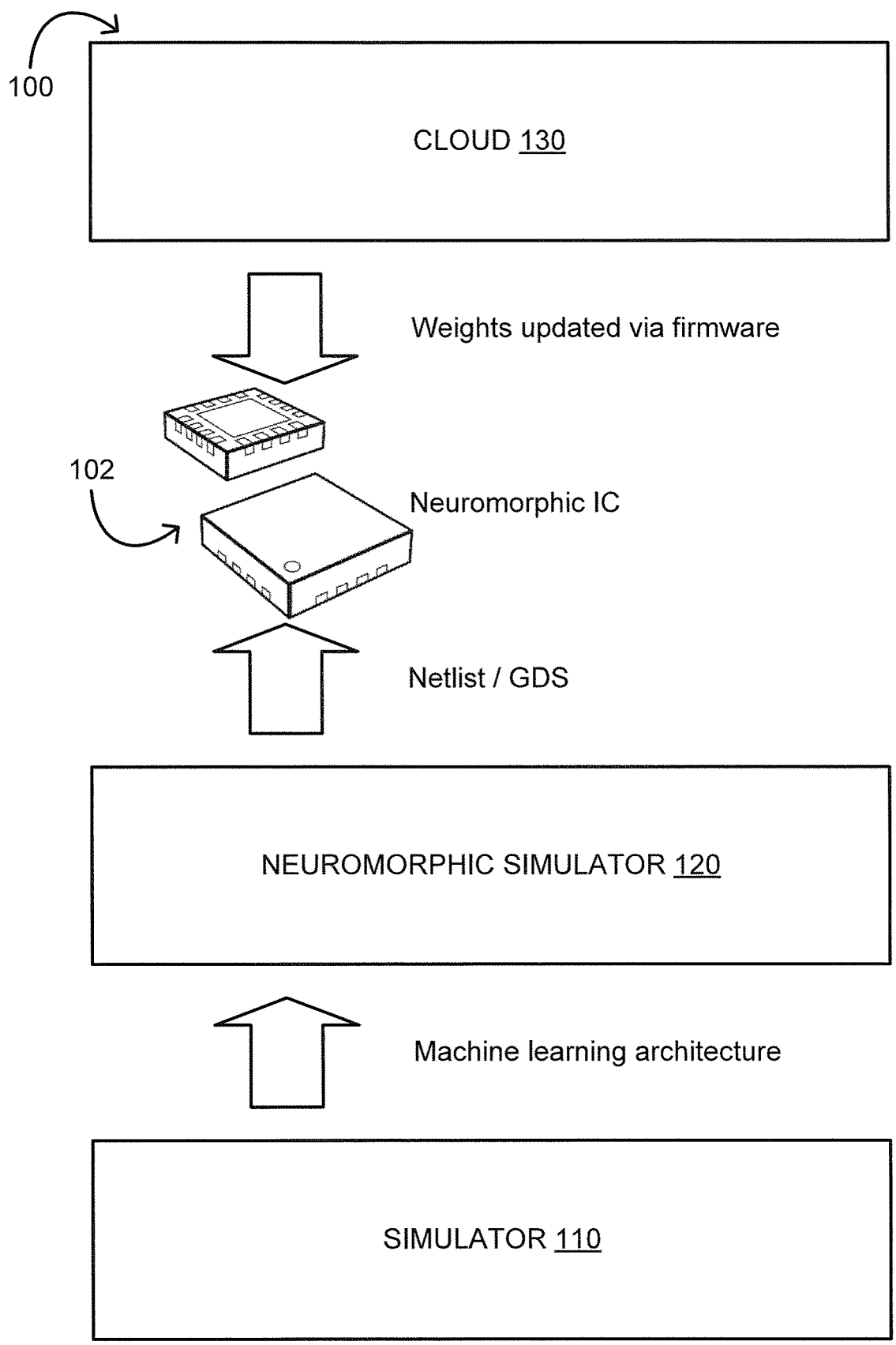
FIG. 1 illustrates a system for designing and updating neuromorphic integrated circuits ("ICs") in accordance with some embodiments.

In the following description, certain terminology is used to describe features of the invention. For example, in certain situations, the term "logic" can be representative of hardware, firmware, or software that is configured to perform one or more functions. As hardware, logic can include circuitry having data processing or storage functionality. Examples of such circuitry can include, but are not limited or restricted to a microprocessor, one or more processor cores, a programmable gate array, a microcontroller, a controller, an application specific integrated circuit, wireless receiver, transmitter or transceiver circuitry, semiconductor memory, or combinatorial logic.

The term "process" can include an instance of a computer program (e.g., a collection of instructions, also referred to herein as an application). In one embodiment, the process can be included of one or more threads executing concurrently (e.g., each thread can be executing the same or a different instruction concurrently).

The term "processing" can include executing of a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file can be accessed, opened, stored, manipulated or otherwise processed as a single entity, object or unit. A file can contain other files, and can contain related or unrelated contents or no contents at all. A file can also have a logical format or be part of a file system having a logical structure or organization of plural files. Files can have a name, sometimes called simply the "filename," and often appended properties or other metadata. There are many types of files, such as data files, text files, program files, and directory files. A file can be generated by a user of a computing device or generated by the computing device. Access or operations on a file can be mediated by one or more applications or the operating system of a computing device. A filesystem can be configured to organize the files of the computing device of a storage device. The filesystem can enable tracking of files and enable access of those files. A filesystem can also enable operations on a file. In some embodiments the operations on the file can include file creation, file modification, file opening, file reading, file writing, file closing, and file deletion.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Again, disclosed herein are systems and methods for customizing neural networks with custom processing capabilities for new applications and new situations in existing applications.

Referring now to FIG. 1, a system 100 is illustrated for designing and updating neuromorphic ICs in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the nodes, the initial firmware can be updated as needed by the cloud 130 to adjust the weights. Being as the cloud 130 is configured to update the firmware of the neuromorphic IC 102, the cloud 130 is not needed for everyday use of the neuromorphic IC 102.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSPs") including, but not limited to, keyword spotting, speaker identification, one or more audio filters, speech enhancement, gesture recognition, image recognition, video object classification and segmentation, or autonomous vehicles including drones. For example, if the particular problem is one of keyword spotting, the simulator 110 can create a machine learning architecture with respect to one or more aspects of keyword spotting. The neuromorphic synthesizer 120 can subsequently transform the machine learning architecture into a netlist and a GDS file corresponding to a neuromorphic IC for keyword spotting, which can be fabricated in accordance with current IC fabrication technology. Once the neuromorphic IC for keyword spotting is fabricated, it can be deployed to work on keyword spotting in, for example, a system or device.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet of things ("IoT") devices, or hearing devices or systems.

Figure 2:
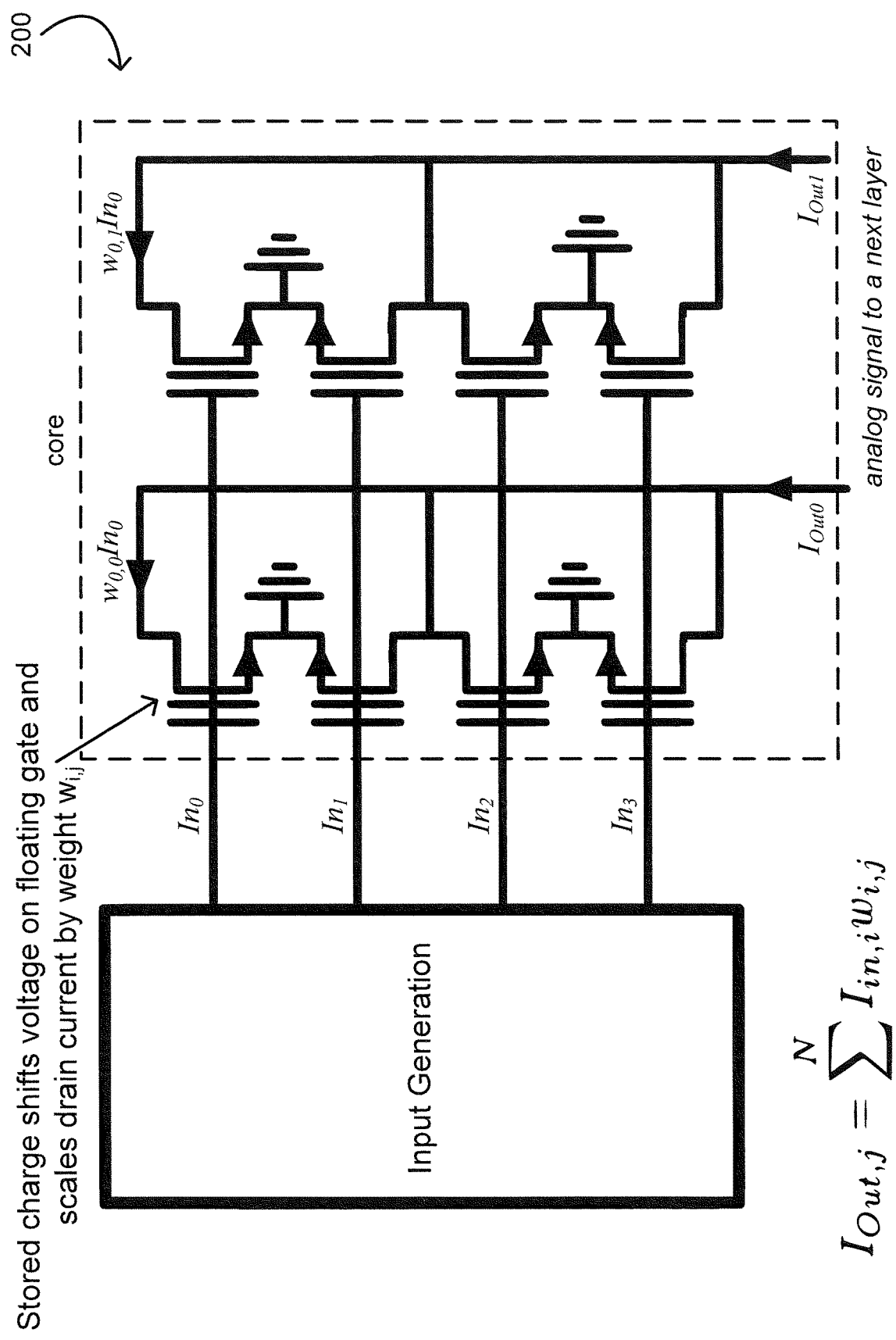
FIG. 2 illustrates an analog multiplier array in accordance with some embodiments.

Referring now to FIG. 2, an analog multiplier array 200 is illustrated in accordance with some embodiments. Such an analog multiplier array can be based on a digital NOR flash array in that a core of the analog multiplier array can be similar to a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC. However, the neural network is not limited to the foregoing. The neural network can further include a digital layer in addition to analog layers of the neural network disposed in the analog multiplier array 200.

Since the analog multiplier array 200 is an analog circuit, input and output currents can vary in a continuous range instead of simply on or off. This is useful for storing synaptic weights (aka weights or coefficients) of the neural network as opposed to digital bits. In operation, the weights are multiplied by input currents to provide output currents that are combined to arrive at a decision of the neural network.

The analog multiplier array 200 can utilize standard programming and erase circuitry to generate tunneling and erase voltages.

Figure 3:
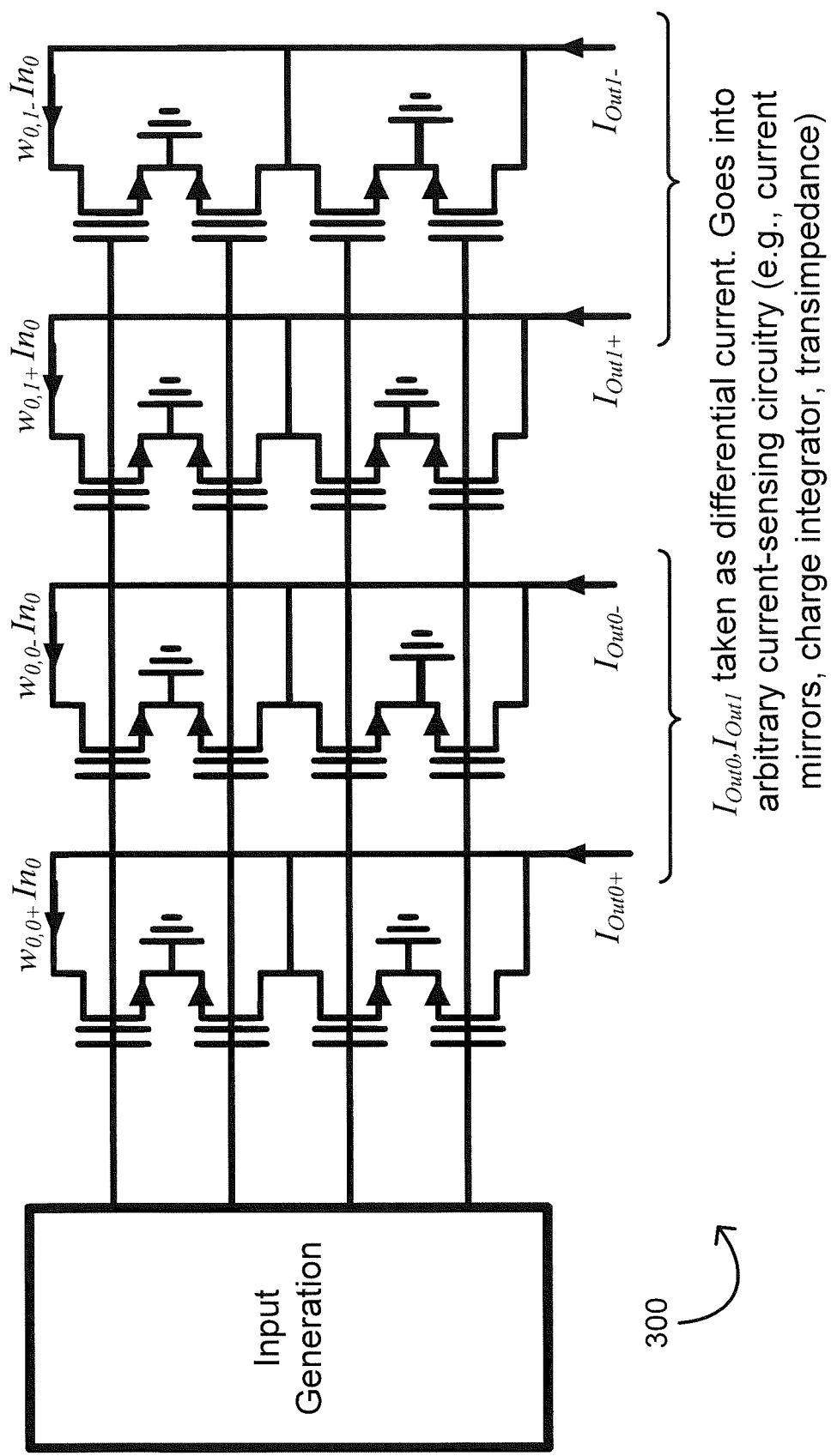
FIG. 3 illustrates an analog multiplier array in accordance with some embodiments.

Referring now to FIG. 3, an analog multiplier array 300 is illustrated in accordance with some embodiments. The analog multiplier array 300 can use two transistors (e.g., a positive metal-oxide-semiconductor field-effect transistor ["MOSFET"] and a negative MOSFET) to perform a two-quadrant multiplication of a signed weight (e.g., a positive weight or a negative weight) and a non-negative input current. If an input current is multiplied by a positive or negative weight, the product or output current can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). The foregoing positively and negatively weighted products or output signals can be taken as a differential current to provide useful information for making a decision.

Because each output current from the positive or negative transistor is wired to ground and proportional to the product of the input current and the positive or negative weight, respectively, the power consumption of the positive or negative transistor is near zero when the input currents or weights are at or near zero. That is, if the input signals are '0,' or if the weights are '0,' then no power will be consumed by the corresponding transistors of the analog multiplier array 300. This is significant because in many neural networks, often a large fraction of the weights are '0,' especially after training. Therefore, energy is saved when there is nothing to do or going on. This is unlike differential pair-based multipliers, which consume a constant current (e.g., by means of a tail bias current) regardless of the input signal.

Figure 4:
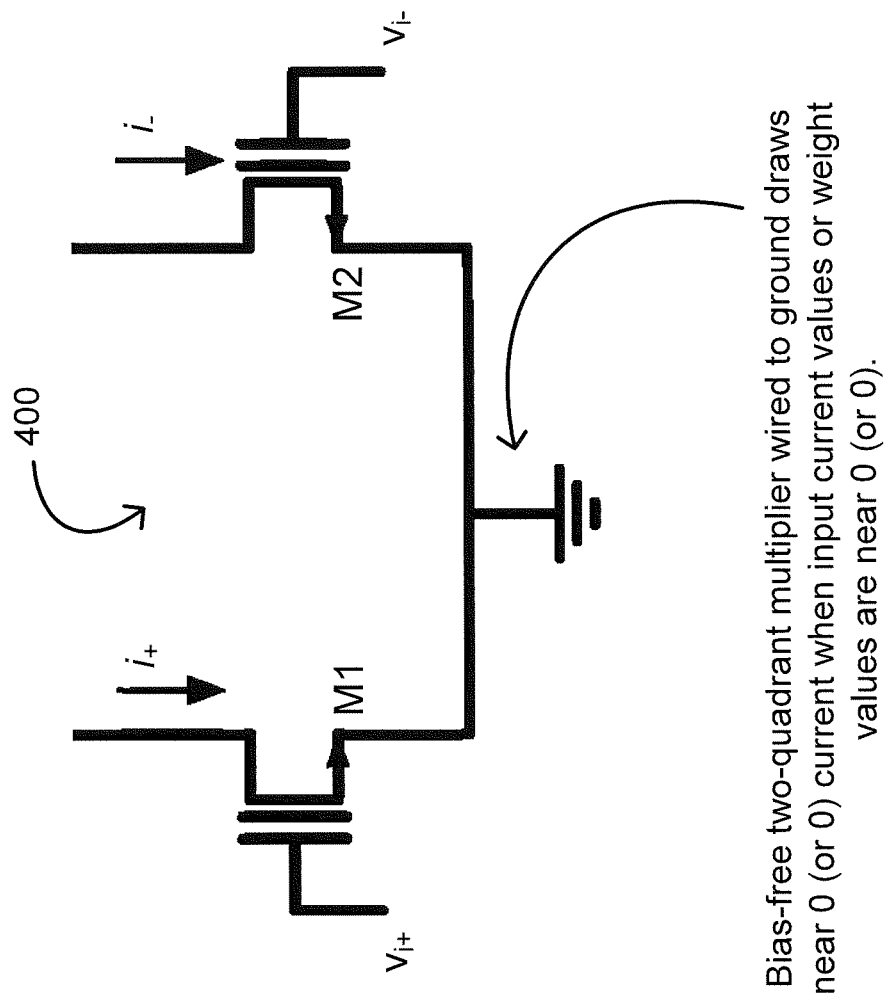
FIG. 4 illustrates a bias-free, two-quadrant multiplier of an analog multiplier array in accordance with some embodiments.

Referring now to FIG. 4, a bias-free, two-quadrant multiplier 400 of an analog multiplier array such as the analog multiplier array 300 is illustrated in accordance with some embodiments. Because each output current from the positive transistor (e.g., M1 of the two-quadrant multiplier 400) or the negative transistor (e.g., M2 of the two-quadrant multiplier 400) is wired to ground and proportional to the product of the input current and the positive or negative weight, respectively, the power consumption of the positive or negative transistor is at or near zero when the input currents or weights are at or near zero. That is, if the input signals are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current) regardless of the input signal.

When programming a two-quadrant multiplier such as the bias-free, two-quadrant multiplier 400, each programmable cell can be erased (e.g., the cell including transistor M1 and the cell including transistor M2) thereof to set the cells to one extreme weight before setting each of the cells to its target weight. Extending this to a full array such as the analog multiplier array 300, all of the programmable cells in the full array can be set to one extreme weight before setting each of the cells to its target weight. When setting the cells to their desired weights, a problem of overshoot exists if one or more of the cells is set with a higher weight than targeted. That is all of the cells in the full array must be reset to the one extreme weight before resetting the cells to their target weights. However, the differential structure of each of the bias-free, two-quadrant multipliers of the analog multiplier arrays provided herein allows for compensating such overshoot by programming, thereby providing a distinct advantage over current technology by obviating the time-consuming process of erasing and resetting all of the cells in an array.

In an example of compensating for overshoot by programming, $v_{i-}$ and $v_{i+}$ of the two-quadrant multiplier 400 can be erased to set the cells to one extreme weight. After erasing the cells, if $v_{i-}$ is programmed with too large a weight, $v_{i+}$ can be programmed with a larger weight than initially targeted to compensate for the weight of $v_{i-}$ and achieve the initially targeted effect. Therefore, the differential structure can be exploited to compensate for programming overshoot without having to erase any one or more cells and start over.

Figure 5:
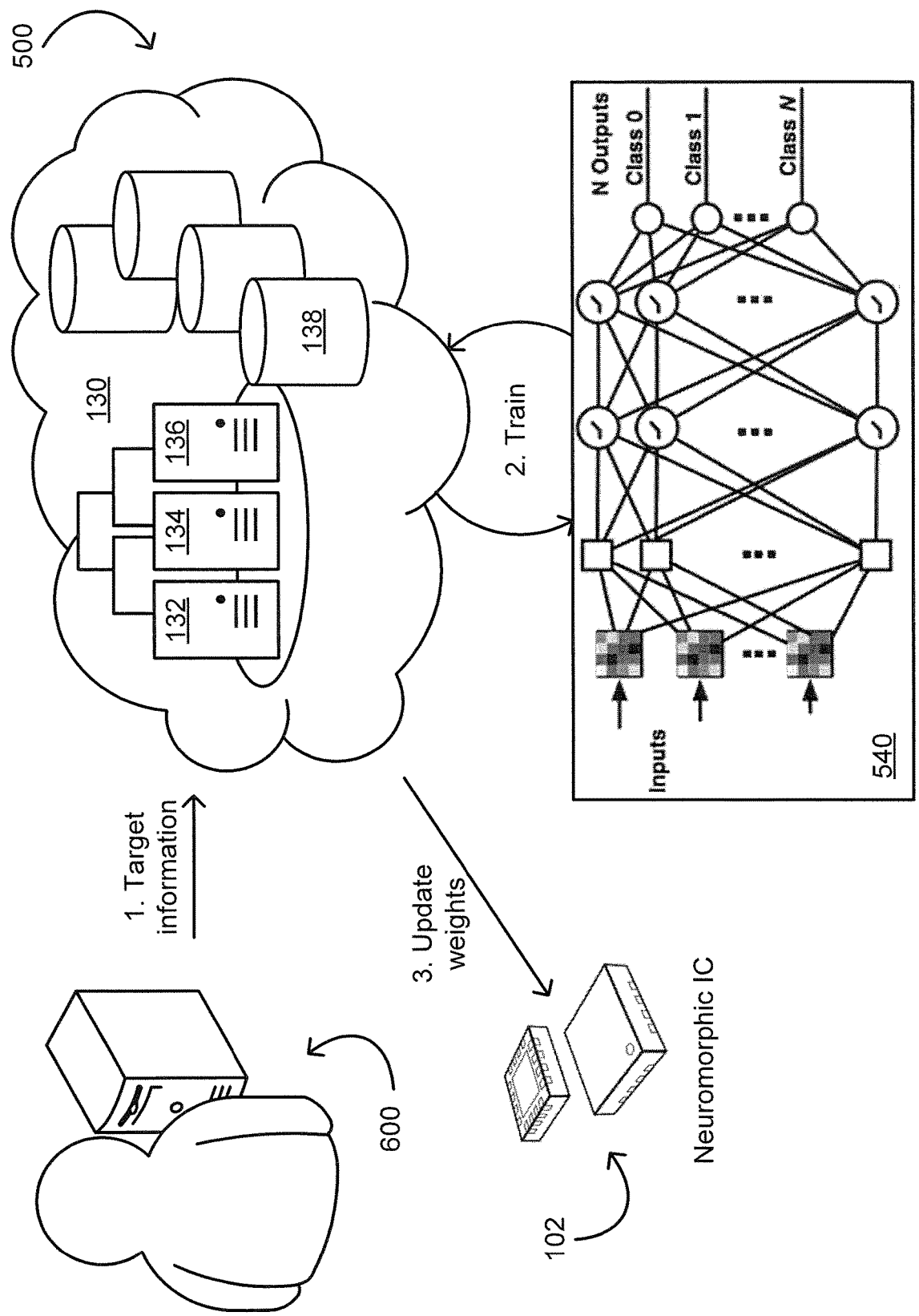
FIG. 5 illustrates a system for customizing neural networks on neuromorphic ICs in accordance with some embodiments.
Figure 6:
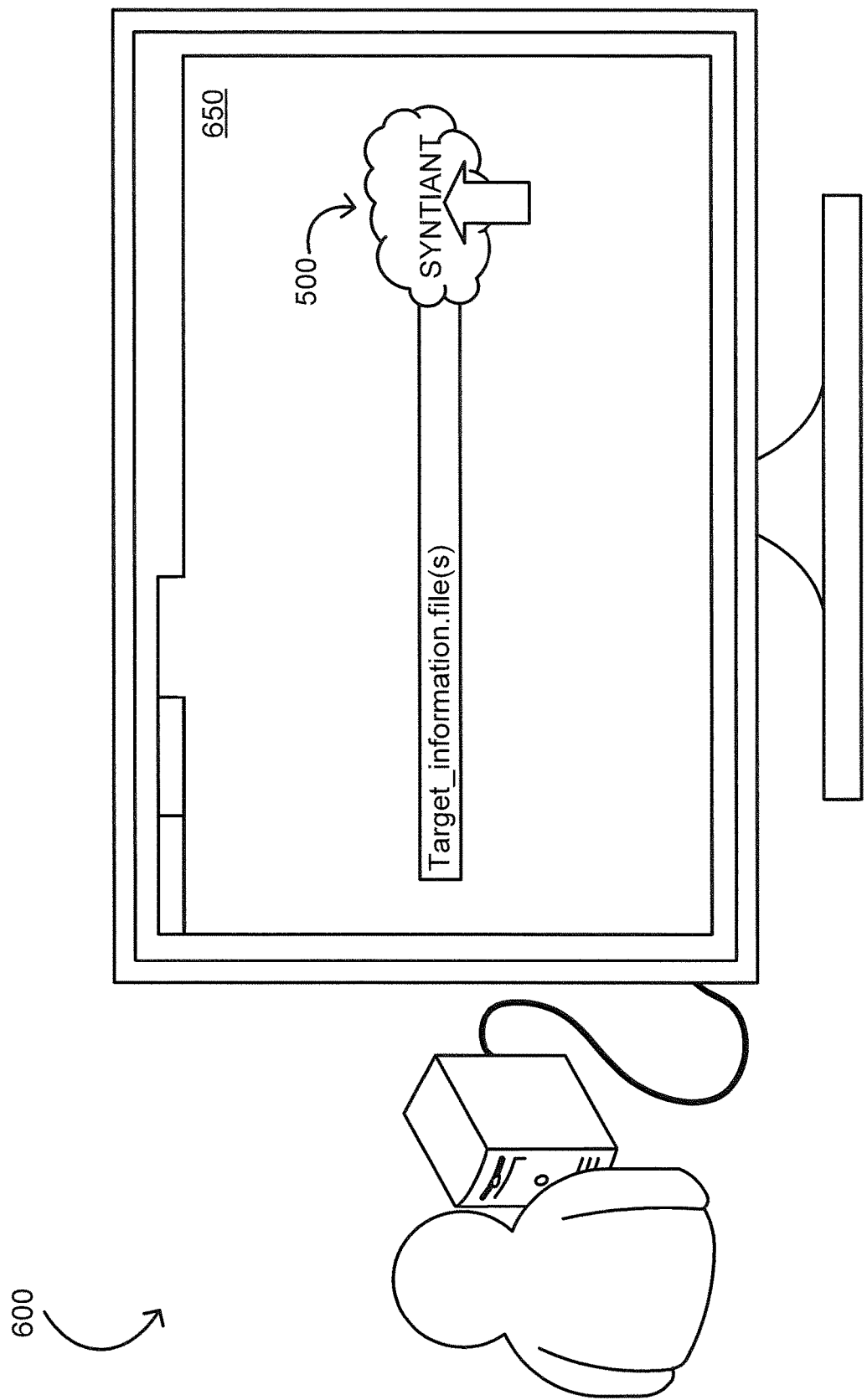
FIG. 6 illustrates a user on a client machine interfacing with a web application coupled to the system of FIG. 5 in accordance with some embodiments.

Referring now to FIG. 5, a system 500 for customizing neural networks on neuromorphic ICs is illustrated in accordance with some embodiments. FIG. 6 illustrates a user on a client machine 600 interfacing with a web application 650 coupled to the system 500 in accordance with some embodiments. As shown in FIGS. 5 and 6 and with reference to FIG. 1, the system 500 includes the cloud 130, which cloud 130 includes one or more servers such as one or more web servers 132, one or more web application servers 134, and one or more database servers 136, as well as one or more databases 138. The one or more servers are implemented using a microprocessor for operation with cloud 130. The one or more web servers 132 are configured to receive user-specific target information sent from the web application 650 for training a neural network, wherein the neural network is on a neuromorphic IC such as the neuromorphic IC 102, an analog chip, a digital signal processor ("DSP"), or some other platform. The one or more web servers 132 are configured to send the user-specific target information to the one or more web application servers 134, which are, in turn, configured to send the user-specific target information to the one or more database servers 136.

While the web application 650 is primarily described herein for sending the user-specific target information to the system 500, a locally installed application on the client machine 600 can also be used to send the user-specific target information over a network connection to the system 500 with some modifications to the foregoing. For example, the system 500 need not include or at least not need to utilize the one or more web servers 132 or web application servers 134 for receiving the user-specific target information from the locally installed application on the client machine 600. Instead, the system 500 can include an application programming interface ("API") configured to receive the user-specific target information for the one or more database servers 136. Regardless of the manner in which the one or more database servers 136 receives the user-specific target information, the one or more database servers 136 are configured to merge the user-specific target information in the one or more databases 138.

The one or more databases 138 are configured to include target information, which can be updated over time with additional target information such as the user-specific target information. As used herein, "existing target information" includes any existing target information in the one or more databases 138 prior to an instance of merging the existing target information with a set of user-specific target information to form merged target information. With this in mind, the one or more database servers 136 are configured to receive the user-specific target information from the one or more web application servers 134 and merge the user-specific target information to form the merged target information in the one or more databases 138.

Target information or target signals depend upon the ASSPs for which the neuromorphic ICs are designed, which ASSPs include, but are not limited to, keyword spotting, speaker identification, one or more audio filters, gesture recognition, image recognition, video object classification and segmentation, or autonomous vehicles including drones. As such, target information can include specific keywords for keyword spotting, specific speakers for speaker identification, image classes for image recognition, and so on. For example, a neuromorphic IC designed for a voice-controlled coffee maker can be customized such that a neural network on the coffee maker's neuromorphic IC recognizes target information or keywords such as "brew," stop," "more," "less," etc. For example, a neuromorphic IC designed for a voice-controlled air conditioner can be customized such that a neural network on the air conditioner's neuromorphic IC recognizes target information or keywords such as "warmer," "cooler," "on," "off," etc. For example, a neuromorphic IC designed for smart home can be customized such that a neural network on a neuromorphic IC of the smart home recognizes target information or keywords such as "door unlock," "door lock," etc. For example, a neuromorphic IC designed for a smart camera can be customized such that a neural network on the smart camera's neuromorphic IC recognizes target information or image classes such as humans, animals, etc. The neuromorphic IC designed for the smart camera can be further customized such that the neural network on the smart camera's neuromorphic IC recognizes target information or acoustic signals such as gunshots, breaking glass, etc.

While not expressly shown in FIG. 5, the system 500 further includes a training set builder, a trainer, and a file builder in some embodiments. The training set builder is configured to build a training set (e.g., a user-specific training set) for training a software-based neural network on the system 500 from the merged target information. The training set can be built to use existing training for existing target information so as to not waste time and resources retraining the software-based neural network on that the neural network has already learned. The trainer is configured to train the software-based neural network with the training set to determine a set of synaptic weights for the neural network. The trainer is further configured to update the synaptic weights for the software-based neural network for previously learned existing target information in view of newly learned user-specific target information. Updating the synaptic weights need not include retraining, and in this way, the trainer, too, saves time and resources by not retraining that which the software-based neural network has already learned.

The foregoing software-based neural network on the system 500 is a software representation of a neural network on a neuromorphic IC such as the neuromorphic IC 102. The neuromorphic IC 102 can be the user's neuromorphic IC such as a customer's neuromorphic IC for which the user-specific target information was uploaded to the system 500. As such, the synaptic weights for an existing neuromorphic IC or a design for a neuromorphic IC can be easily updated with custom processing capabilities for new applications or new situations in existing applications. The file builder of the system 500 is configured to build a file of the set of synaptic weights for updating firmware of the neuromorphic IC including the neural network as described in reference to at least FIG. 1 and FIG. 7D.

Figure 7A:
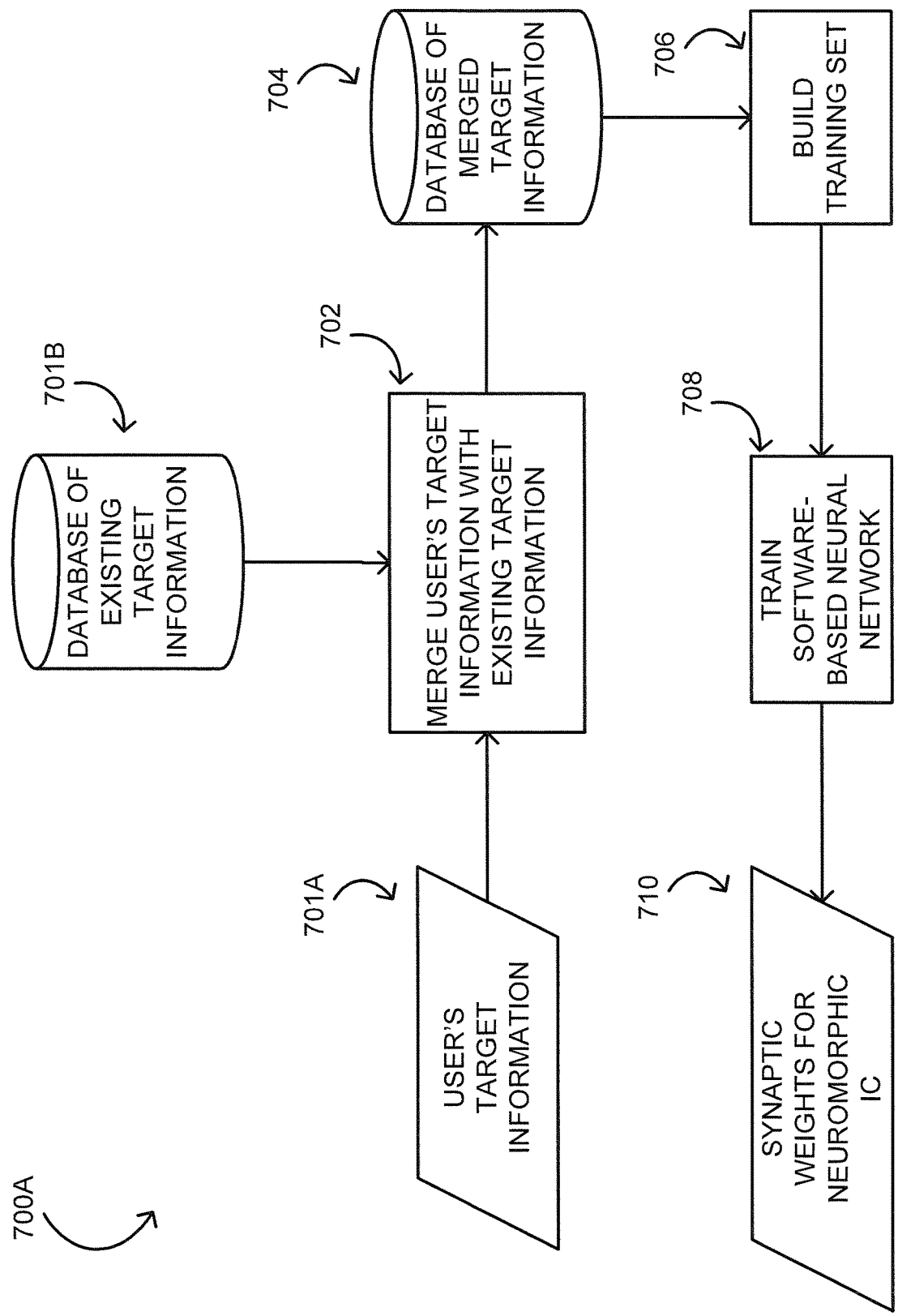
FIG. 7A illustrates a method for customizing neural networks on neuromorphic ICs in accordance with some embodiments.

Referring now to FIG. 7A, a method 700A for customizing neural networks on neuromorphic ICs is illustrated in accordance with some embodiments. As shown in FIG. 7A, the method 700A includes a process step 702 of merging user-specific target information 701A with existing target information 701B from one or more databases to provide merged target information in the one or more databases 704. As set forth herein, the one or more database servers 136 are configured to receive the user-specific target information from the one or more web application servers 134, and the one or more database servers 136 are further configured to automatically merge the user-specific target information with the existing target information from the one or more databases 138 to provide the merged target information in the one or more databases 138. The method 700A further includes a processes step 706 including building a training set (e.g., a user-specific training set), a process step 708 including training a software-based neural network with the training set, and a process step 710 including providing a set of synaptic weights for a neuromorphic IC. As set forth herein, the training set builder is configured to build the training set, and the trainer is configured to train the software-based neural network.

Figure 7B:
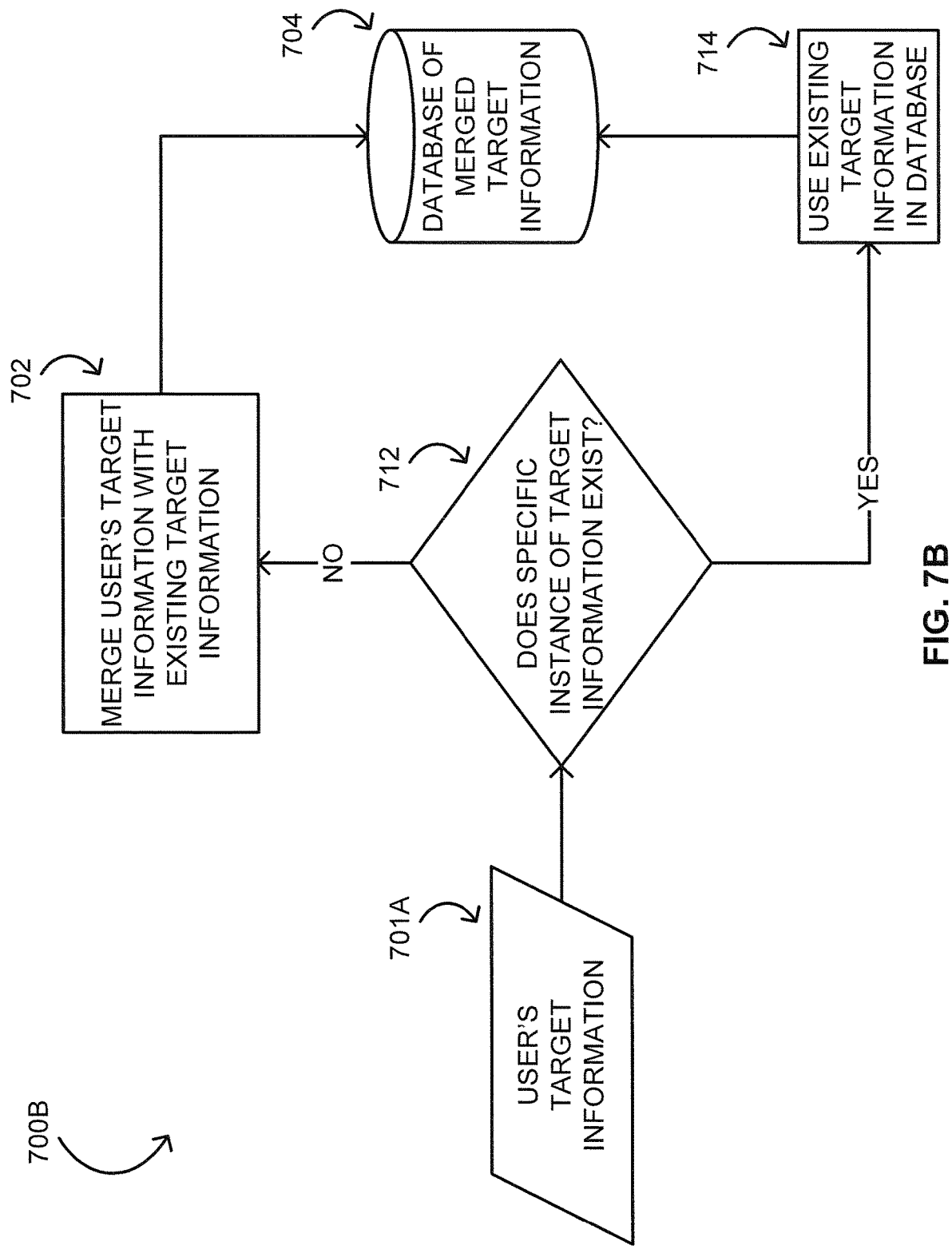
FIG. 7B illustrates a method for merging user-specific target information in a database in accordance with some embodiments.

Referring now to FIG. 7B, a method 700B for merging user-specific target information in a database is illustrated in accordance with some embodiments. As shown, the method 700B for merging the user-specific target information 701A in a database such as the one or more databases 138, a copy of the database, or a subset of the database includes a process step 712 of determining whether a specific instance of the user-specific target information (e.g., specific keyword, specific speaker, image, etc.) exists as existing target information in the database. If the specific instance of the user-specific target information exists in the database as existing target information, the specific instance of the user-specific target information need not be merged in the database, and the specific instance of the user-specific target information in the existing target information is used instead (process step 714). If the specific instance of the user-specific target information does not exist in the database as existing target information, the specific instance of the user-specific target information is merged in the database for building a training set (e.g., a user-specific training set) (process step 702).

While not shown in FIG. 7B, merging the user-specific target information in the database further includes labeling the target information in the database, a copy of the database, or a subset of the database for building the training set (e.g., a user-specific training set). Table 1 set forth below shows example labels for existing target information in a database (e.g., the one or more databases 138) including keywords for keyword spotting. If a specific instance of the user-specific target information exists in the database as existing target information, the specific instance of the user-specific target information need not be relabeled as desired target information in the merged target information. If the user-specific target information includes background information (e.g., background noise in the context of keyword spotting) and such background information exists in the database as existing target information, the background information is relabeled as such in the merged target information. Table 2 set forth below shows example labels for merged target information in a database (e.g., the one or more databases 138) including keywords for keyword spotting, wherein certain instances of existing target information are relabeled as "noise" or "other." (See Tables 1 and 2 and compare.) If a specific instance of the user-specific target information does not exist in the database as existing target information, the specific instance of the user-specific target information is merged with the existing target information and provided an appropriate label for desired target information in the merged target information.

TABLE 1

Existing target information in the database.

| Database File | Label |
|---|---|
| on_01.wav | 'on' |
| on_02.wav | 'on' |
| off_01.wav | 'off' |
| off_02.wav | 'off' |
| hot_01.wav | 'hot' |
| hot_02.wav | 'hot' |
| cold_01.wav | 'cold' |
| cold_02.wav | 'cold' |
| door_unlock01.wav | 'door_unlock' |
| door_unlock02.wav | 'door_unlock' |
| door_lock01.wav | 'door_lock' |
| door_lock02.wav | 'door_lock' |
| subway01.wav | 'noise' or 'other' |
| restaurant01.wav | 'noise' or 'other' |

TABLE 2

Merged target information in the database.

| Database File | Word |
|---|---|
| on_01.wav | 'noise' |
| on_02.wav | 'noise' |
| off_01.wav | 'noise' |
| off_02.wav | 'noise' |
| hot_01.wav | 'noise' |
| hot_02.wav | 'noise' |
| cold_01.wav | 'noise' |
| cold_02.wav | 'noise' |
| door_unlock01.wav | 'door_unlock' |
| door_unlock02.wav | 'door_unlock' |
| door_lock01.wav | 'door_lock' |
| door_lock02.wav | 'door_lock' |
| subway01.wav | 'noise' |
| restaurant01.wav | 'noise' |

The labeled target information in the merged target information (e.g., the merged target information of Table 2) can be subsequently extracted from the database for automatically building the training set (e.g., a user-specific training set). In doing so, features are extracted from the merged target information such as time-varying frequency content in audio recordings. A software-based neural network can be trained to recognize the desired target information (e.g., "door unlock" and "door lock") and the features of the desired target information while disregarding the background information (e.g., "noise" or "other") and the features of the background information. Such training includes providing the features as input to the software-based neural network and adjusting the synaptic weights using neural network optimization algorithms (e.g. gradient descent in TensorFlow) such that output of the neural network is positive when desired target information is recognized. Such training results in a plurality of synaptic weights for programming a hardware-based neural network on a neuromorphic IC, an analog chip, a DSP, or some other platform, wherein the software-based neural network and the software-based neural network correspond to each other. The plurality of synaptic weights are mapped to physical quantities (e.g., currents) that individual circuit elements of the hardware-based neural network embody. Once programmed, the hardware-based neural network is configured to execute on that which the counterpart software-based neural network was trained (e.g., classification tasks such as keyword spotting such as "door unlock" and "door lock" in a smart home environment).

Figure 7C:
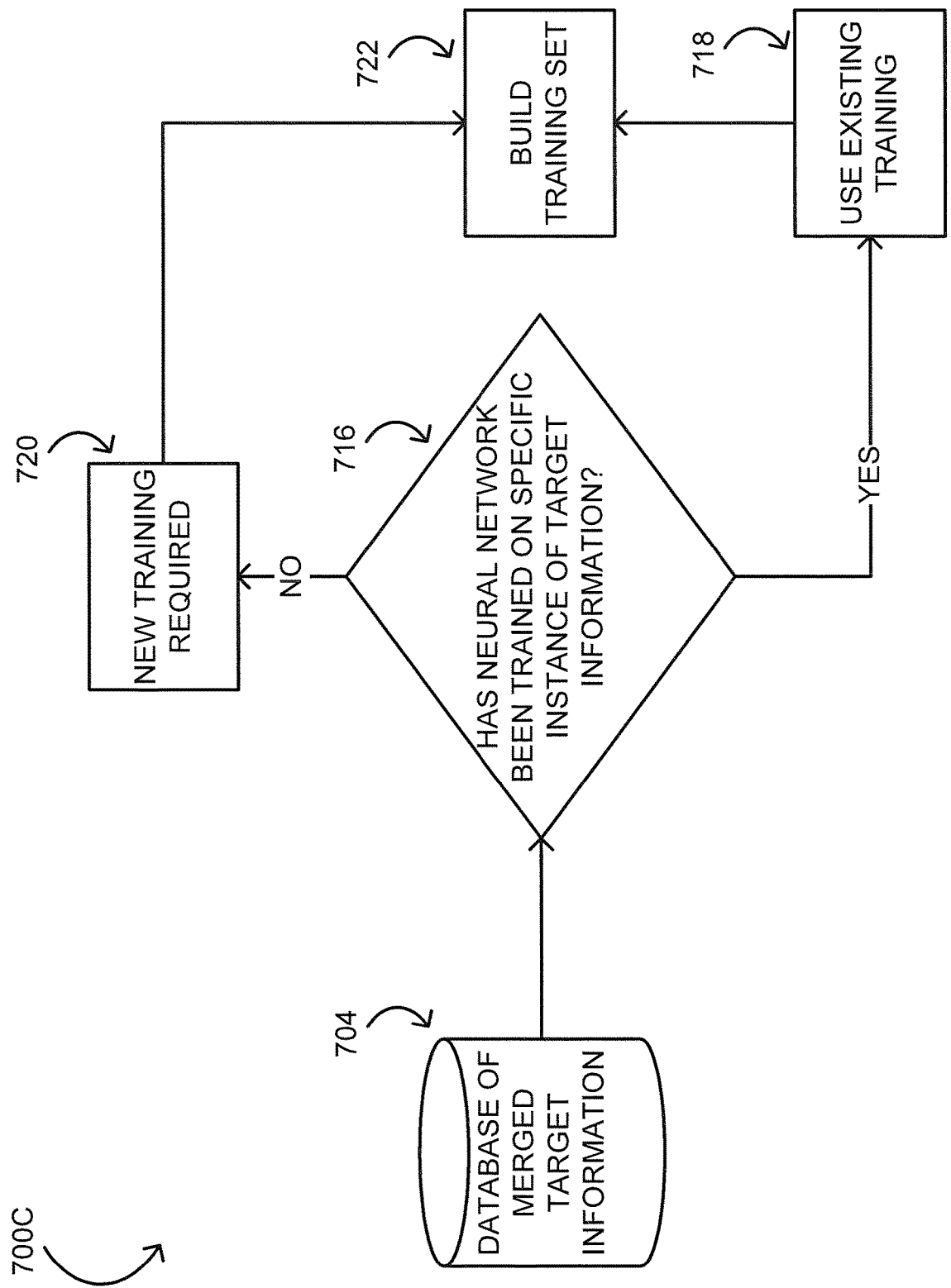
FIG. 7C illustrates a method for building a training set in accordance with some embodiments.

Referring now to FIG. 7C, a method 700C for building a training set is illustrated in accordance with some embodiments. As shown, the method 700C for building a training set (e.g., a user-specific training set) includes a process step 716 of determining whether a software-based neural network has been trained on a specific instance of user-specific target information (e.g., specific keyword, specific speaker, image, etc.). If the software-based neural network has been trained on a specific instance of the user-specific target information, the trainer is configured to build the training set to use existing training for the specific instance of the user-specific target information (process step 718). Instances of the software-based neural network having been trained on user-specific target information can occur when the user-specific target information already exists in the database as existing target information. If the software-based neural network has not been trained on a specific instance of the user-specific target information, the trainer is configured to build the training set to train the neural network on the specific instance of the user-specific target information (process step 720). The 700D concludes with a process step 722 of building the training set.

Figure 7D:
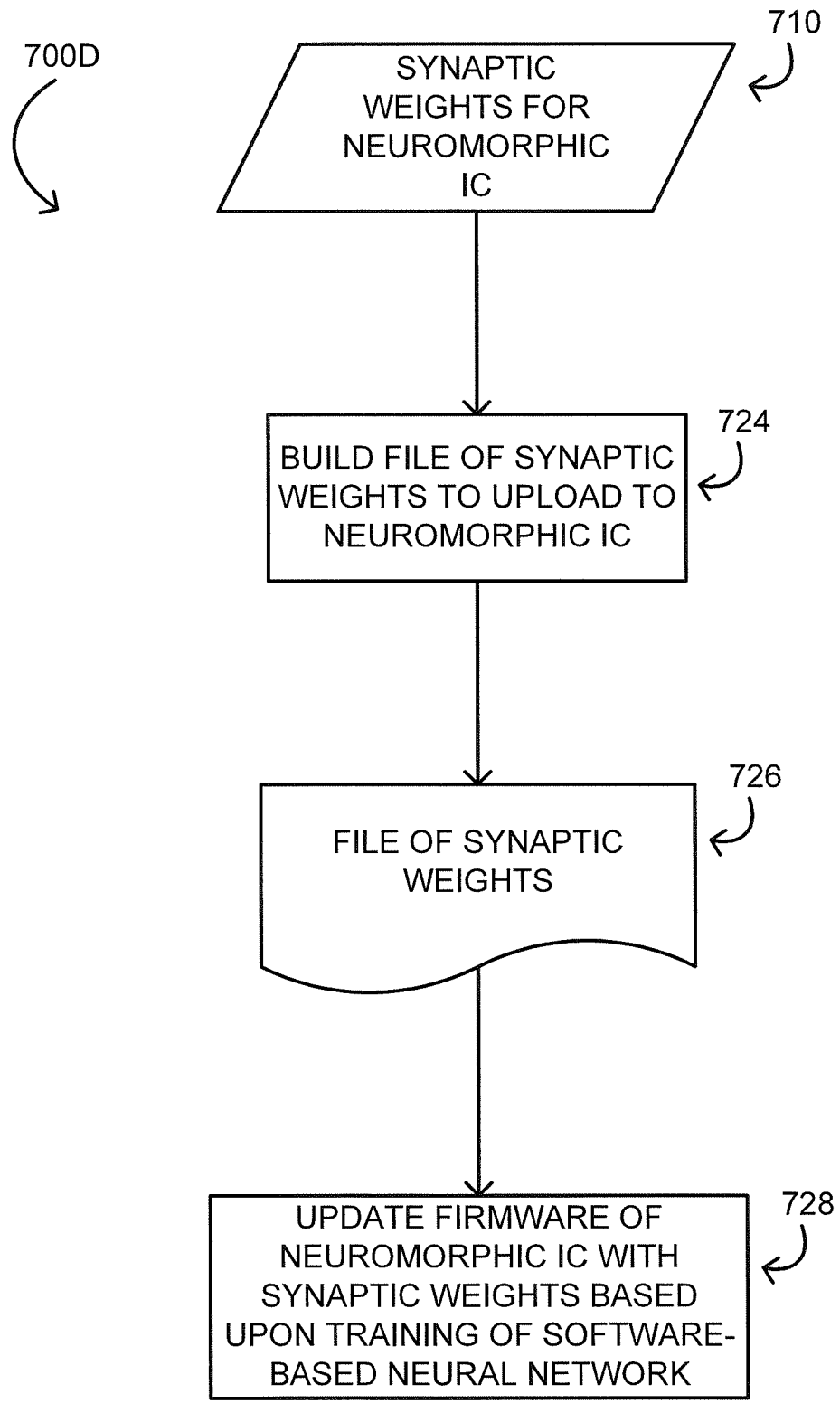
FIG. 7D illustrates a method for updating firmware of a neuromorphic IC with new synaptic weights in accordance with some embodiments.

Referring now to FIG. 7D, a method 700D for updating firmware of a neuromorphic IC with new synaptic weights is illustrated in accordance with some embodiments. As shown, the method 700D includes a process step 724 of building a file of synaptic weights to upload to a neuromorphic IC. The builder is configured to build the file of synaptic weights 726 from output resulting from training a software-based neural network with a training set on merged target information including user-specific target information. The method 700D further includes a process step 728 of updating firmware of a neuromorphic IC with the file of synaptic weights.

Figure 8:
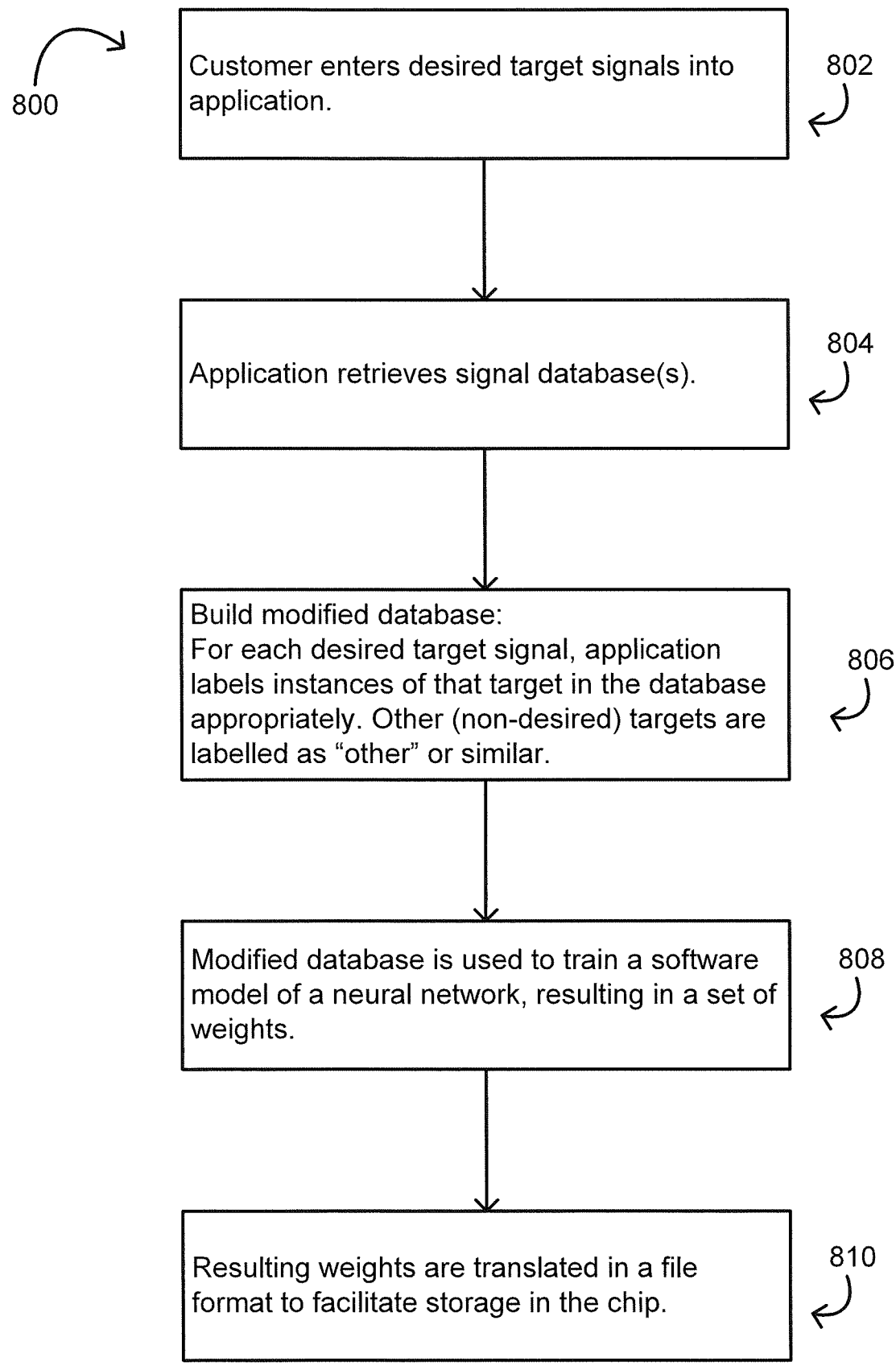
FIG. 8 illustrates a method for customizing neural networks on neuromorphic ICs in accordance with some embodiments.

FIG. 8 illustrates a method 800 for customizing neural networks on neuromorphic ICs in accordance with some embodiments. As shown, the method 800 includes a number of process steps. In a first process step 802, a user or customer enters target signals or user-specific target information into an application such as the web application 650 or a locally installed application with a network connection to the system 500. In a second process step 804, an application on, for example, the one or more of database servers 136 retrieves target signals or existing target information from the one or more databases 138. In a third process step 806, a modified database of the one or more databases 138 including merged target information is built by the one or more database servers 136 from the user-specific target information and the existing target information. For each desired target signal or specific instance of user-specific target information, the application is configured to label instances of the user-specific target information in the modified database appropriately. Other non-desired target signals or instances of user-specific target information are labelled in the modified database as "other" or the like. In a fourth process step 808, the modified database is used for training a software-based neural network representing a neural network on a neuromorphic IC, wherein the training results in a set of synaptic weights for the neural network. In a fifth process step 810, the synaptic weights are translated into a file format to upload and store on the neuromorphic IC.

In the foregoing description, the invention is described with reference to specific exemplary embodiments thereof. It will, however, be evident that various modifications and changes can be made thereto without departing from the broader spirit and scope of the invention as set forth in the appended claims.

What is claimed is:

1. A system for customizing neural networks, comprising:
one or more web application servers comprising a microprocessor configured to receive user-specific target information from a client application for training a neural network on an integrated circuit;
one or more database servers comprising a microprocessor configured to:
(i) receive the user-specific target information from the one or more web application servers and
(ii) merge the user-specific target information in one or more databases including existing target information to form merged target information in the one or more databases, wherein if a first user-specific target information includes background information which already exists in the one or more database servers as an existing target information, the first user-specific target information is re-labeled as a background information;

wherein the system is configured to build a training set for training a software-based version of the neural network from the merged target information and
to train the software-based version of the neural network with the training set to determine a set of synaptic weights for the neural network on the integrated circuit.

2. The system of claim 1, wherein the system is further configured to build the training set to use existing training for the existing target information.

3. The system of claim 1, wherein the system is further configured to update the synaptic weights for the software-based neural network for previously learned existing target information in view of newly learned user-specific target information.

4. The system of claim 1,
wherein the system is further configured to build a file of the set of synaptic weights for updating firmware of the integrated circuit including the neural network.

5. The system of claim 4, wherein the one or more web application servers are further configured to provide the file to the client application for updating the firmware of the integrated circuit with the set of synaptic weights for the neural network.

6. A system for customizing neural networks, comprising:
one or more web application servers comprising a microprocessor configured to receive user-specific target information from a client application for training a neural network on an integrated circuit;
one or more database servers comprising a microprocessor configured to:
  (i) receive the user-specific target information from the one or more servers and
  (ii) merge the user-specific target information in one or more databases including existing target information to form merged target information in the one or more databases, wherein if a first user-specific target information includes background information which already exists in the one or more database servers as an existing target information, the first user-specific target information is re-labeled as a background information;
wherein the system is configured to build a training set for training a software-based version of the neural network from the merged target information;
wherein the system is configured to train the software-based version of the neural network with the training set to determine a set of synaptic weights for the neural network on the integrated circuit; and
wherein the system is further configured to build a file of the set of synaptic weights for updating firmware of the integrated circuit including the neural network.

7. The system of claim 6, wherein the system is further configured to build the training set to use existing training for the existing target information.

8. The system of claim 7, wherein the system is further configured to update the synaptic weights for the software-based neural network for previously learned existing target information in view of newly learned user-specific target information.

9. The system of claim 8, wherein the one or more web application servers are further configured to provide the file to the client application for updating the firmware of the integrated circuit with the set of synaptic weights for the neural network.

10. A method for customizing neural networks, comprising:
receiving, by one or more servers, user-specific target information from a client application for training a neural network on an integrated circuit;
receiving, by one or more database servers, the user-specific target information from the one or more servers;
merging the user-specific target information in one or more databases including existing target information to form merged target information in the one or more databases, wherein upon a determination that a first user-specific target information includes background information which already exists in the one or more database servers as an existing target information, the first user-specific target information is re-labeled as a background information;
building a training set with a training set builder, the training set for training a software-based version of the neural network from the merged target information; and
training with a trainer the software-based version of the neural network on the training set to determine a set of synaptic weights for the neural network on the integrated circuit.

11. The method of claim 10, further comprising:
labeling the target information in the one or more databases before merging the user-specific target information in the one or more databases, wherein the labeling includes labeling keywords for keyword spotting.

12. The method of claim 10, wherein building the training set includes building the training set configured to use existing training for the existing target information.

13. The method of claim 10, further comprising:
updating, with the trainer, the synaptic weights for the software-based neural network for previously learned existing target information in view of newly learned user-specific target information, wherein the updating includes training the software-based neural network on information other than the existing target information already learned.

14. The method of claim 10, further comprising:
building, with a file builder, a file of the set of synaptic weights for updating firmware of the integrated circuit including the neural network.

15. The method of claim 14, further comprising:
providing the file to the client application, thereby allowing the firmware of the integrated circuit to be updated with the set of synaptic weights for the neural network.

16. The method of claim 10,
wherein the software-based neural network is configured to recognize one or more desired target information and disregard the background information.

17. The method of claim 16, further comprising:
updating, with the trainer, the synaptic weights for the software-based neural network for previously learned existing target information in view of newly learned user-specific target information, wherein the updating includes training the software-based neural network on information other than the existing target information already learned.

18. The method of claim 17, further comprising:
building, with a file builder, a file of the set of synaptic weights for updating firmware of the integrated circuit including the neural network.

19. The method of claim 18, further comprising:
providing the file to the client application, thereby allowing the firmware of the integrated circuit to be updated with the set of synaptic weights for the neural network.

20. The method of claim 19, wherein building the training set includes building the training set configured to use existing training for the existing target information.

* * * * *